United States Patent [19]

Okumura et al.

[11] Patent Number: 4,997,600
[45] Date of Patent: Mar. 5, 1991

[54] PROCESS FOR PREPARATION OF THERMOPLASTIC RESIN SHEETS

[75] Inventors: Tsuguo Okumura, Tsukuba; Shinichi Ohashi, Tsuchiura; Hitoshi Matsuda, Tsuchiura; Kazuhisa Miyashita, Tsuchiura; Naomichi Yamagishi, Abiko, all of Japan

[73] Assignee: Mitsubishi Monsanto Chemical Company, Ltd., Tokyo, Japan

[21] Appl. No.: 356,269

[22] Filed: May 23, 1989

[30] Foreign Application Priority Data

May 24, 1988 [JP] Japan ............................ 63-126251
May 24, 1988 [JP] Japan ............................ 63-126252

[51] Int. Cl.$^5$ .................... B29C 59/10; B29C 71/04
[52] U.S. Cl. ................................. 264/22; 264/24; 264/216; 425/174.8 E; 425/224
[58] Field of Search ................ 264/22, 24, 216; 425/174.8 E, 174.8 R, 174, 224

[56] References Cited

U.S. PATENT DOCUMENTS

| | | | |
|---|---|---|---|
| 3,898,026 | 8/1975 | Sauer et al. | 425/174.8 E |
| 4,478,772 | 10/1984 | Takagi et al. | 264/22 |
| 4,594,203 | 6/1986 | Hagiwara et al. | 264/22 |

FOREIGN PATENT DOCUMENTS

| | | | |
|---|---|---|---|
| 48-14785 | 5/1973 | Japan | 264/24 |
| 48-29311 | 9/1973 | Japan | 264/216 |
| 62-27128 | 2/1987 | Japan | 264/22 |
| 62-27129 | 2/1987 | Japan | 264/22 |
| 63-81017 | 4/1988 | Japan | 425/174.8 E |
| 63-154326 | 6/1988 | Japan | 264/22 |

*Primary Examiner*—Jeffery Thurlow
*Attorney, Agent, or Firm*—Burgess, Ryan & Wayne

[57] ABSTRACT

A thermoplastic sheet is prepared by (i) extruding a molten thermoplastic resin in the form of a sheet from a molding die; (ii) applying static charges to the extruded resin sheet from a first electrode whereby the charged resin sheet is pinned to the surface of an electrical insulating layer of a quenching roller to quench the resin sheet; (iii) peeling the quenched sheet from the surface of the quenching roller; and (v) applying electrostatic charges having a reverse polarity to that of the electrostatic charges from the first electrode to the exposed surface portion of the quenching roller from a second electrode. The quenching roller is made of an electrically earthed substrate and the electrical insulating layer formed on the surface of the substrate. The second electrode is made of a plurality of electrodes arranged at intervals along the rotating direction of the quenching roller between the sheet-peeling position where the quenched sheet is peeled from the quenching roller and the sheet pinning-initiating position where the sheet to be quenched is pinned to the quenching roller, and the electrical insulating layer has a volume resistance and surface resistance of at least $10^7$ Ω and a surface roughness not larger than 0.3 μm expressed as the center line average roughness (Ra).

3 Claims, 5 Drawing Sheets

PROCESS FOR PREPARATION OF THERMOPLASTIC RESIN SHEETS

BACKGROUND OF THE INVENTION (1) Field of the Invention

The present invention relates to a process for the preparation of thermoplastic resin sheets, especially thermoplastic resin sheets made from thermoplastic resins having a low electric resistance in the molten state, such as polyamide resin sheets and saponified ethylene/vinyl acetate copolymer (hereinafter referred to as "EVOH") resin sheets. More particularly, the present invention relates to a process for preparing a thermoplastic resin sheet having a smooth surface and an excellent appearance wherein a thermoplastic resin extruded in the form of a sheet from a die of an extruder is pinned firmly to the surface of a quenching roller to rapidly cool the resin sheet by the electrostatic pinning method.

(2) Description of the Related Art

As the conventional process for the preparation of a thermoplastic resin sheet, there can be mentioned a process in which a molten thermoplastic resin sheet melt-extruded from a die is pinned to the surface of a quenching roller to rapidly cool the sheet by the electrostatic pinning method (see, for example, Japanese Examined Patent Publication No. 37-6142).

The volume resistivity of a polyamide resin or EVOH resin in the molten state is in the range of $10^4$ to $10^5$ $\Omega$-cm and is much lower than that of, for example, polyethylene terephthalate or polypropylene, and thus, the polyamide resin or EVOH resin in the molten state is highly electroconductive. Accordingly, even if electrostatic charges are applied to a molten polyamide resin or EVOH resin, a large quantity of electro static charges leaks to a quenching roller and the quantity of electrostatic charges per unit area of the sheet becomes small, and a strong electrostatic attracting force cannot be obtained and therefore, a high sheet-manufacturing speed cannot be obtained.

The present inventors have found that when a nylon-6 sheet is prepared by an ordinary electrostatic pinning method, for example, the method disclosed in Japanese Examined Patent Publication No. 37-6142 described above, the sheet-forming speed capable of providing a sheet having a uniform thickness, smooth surface and excellent appearance is limited to about 25 m/min or lower, and if the sheet-forming speed exceeds this critical level, a pinning trouble called "pinning bubble" occurs, whereby firm pinning and rapid cooling cannot be attained, and thus, a uniform sheet cannot be obtained. Accordingly, the preparation of sheets at a speed of about 25 m/min is not advantageous because of a high manufacturing cost.

Various proposals have been made to cope with this problem. For example, there have been proposed a process in which an electrical insulating layer is formed on the surface of a quenching roller composed of a metal to control leaking of electrostatic charges to the quenching roller from a sheet of a thermoplastic resin such as polyethylene terephthalate or polyamide and increase the pinning force (see, for example, Japanese Examined Patent Publication No. 48-14784, Japanese Examined Patent Publication No. 48-29311 and Japanese Unexamined Patent Publication No. 61-95925), and a process in which a large discharge current is applied to a sheet under a corona discharge in the state of a streamer corona from a pinning electrode, whereby the charge quantity is increased to increase the pinning force (see, for example, Japanese Examined Patent Publication No. 59-23270).

In the conventional process in which a corona discharge is carried out in the state of a streamer corona (Japanese Examined Patent Publication No. 59-23270), a large electric current is necessary for effecting the corona discharge in the state of streamer corona, and therefore, a serious problem arises in connection with safety because of the risk of an electric shock. Moreover, a needle electrode is used in this process, and because of the structure of this pinning electrode, sublimates from the molten sheet, such as monomers and oligomers, tend to adhere to and accumulate on the electrode, and to maintain a stable corona discharge, the electrode must be frequently cleaned or exchanged. Accordingly, it is impossible to continue the preparation over a long period. Moreover, the generation of corona is rendered uneven because of contamination of the needle top of the electrode by the deposited and accumulated sublimates, insufficiently pinned portions are formed in the sheet, and the formed sheet is often contaminated with the deposited sublimates falling on the sheet. To avoid this disadvantage, the electrode must be frequently cleaned, and therefore the productivity is inevitably reduced. Furthermore, the needle top of the electrode is unevenly damaged when the electrode is used for a long time, and accordingly, in many needles arranged in a line along the width direction of the sheet, their heights become uneven, even though slightly, and, as a result, corona cannot uniformly be generated in width direction of the sheet and uneven pinning occurs in the sheet, and thus, it is very difficult to maintain the electrodes in good condition.

The conventional process in which an electrical insulating layer is formed on the surface of a quenching roller (see, for example, Japanese Unexamined Patent Publication No. 61-95925) is significant in that the leakage of static charges is minimized in the electrostatic pinning of a thermoplastic sheet having a low volume resistivity. However, even if this process is practically worked, a sheet having a smooth surface and an excellent appearance cannot be always obtained, the sheet-forming speed is not satisfactorily improved, and the process still involves the following problems.

In the first place, when a thermoplastic resin sheet is prepared by the electrostatic pinning method using a quenching roller having an electrical insulating layer as proposed in the above patent publication, the appearance is often degraded by an infinite number of fine circular shaped bubbles having a diameter of about 0.1 to about 0.2 mm, which are formed over the entire surface of the obtained sheet, and this sheet looks hazy and has a frosted glass-like appearance.

It is considered that this appearance defect occurs because an infinite number of air bubbles are included in the interface between the quenching roller and the sheet pinned thereto and are crushed to small bubbles by the pinning force of the sheet. In the case of a mirror-polished metal quenching roller, even if the pinning is unsatisfactory, the appearance defect caused by an infinite number of fine circular bubbles formed over the entire surface of the sheet is not found. Therefore, it is construed that this appearance defect is due to the electrical insulating layer formed on the surface of the quenching roller.

In the second place, according to the kind of the electrical insulating layer or according to the degree of the electrical insulating property or surface roughness even in the same layer material, the pinning property varies, and in an extreme case, an improvement of the sheet-forming speed cannot be expected.

In the third place, when a thermoplastic sheet is prepared by using a quenching roller having an electrical insulating layer, upon separating the cooled sheet from the roller, peeling charges occurs and the charges formed on the surface of the quenching roller result in an unsatisfactory pinning and a generation of sparks, and therefore, a thermoplastic sheet cannot be prepared stably and efficiently.

Figure 8:
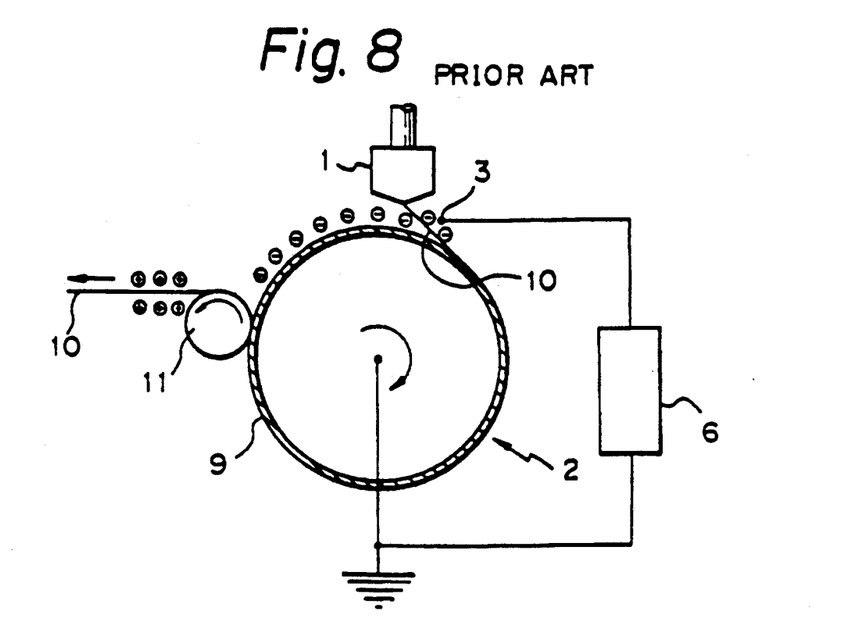
FIGS. 8 and 9 are schematic sides views showing the conventional electrostatic pinning apparatus.

This third problem will now be described in detail with reference to the accompanying drawings. When a quenched thermoplastic resin sheet is peeled from a quenching roller, as shown in FIG. 8 (prior art), the charging occurs on both sides of the sheet (10) and the surface of a quenching roller (2). Where the sheet (10) is a polyamide resin sheet, because of the difference in the electrification rank between the polyamide resin sheet and the ceramic insulation layer (9), in general, the polyamide resin sheet is positively (+) charged while the ceramic layer (9) is negatively (−) charged. In this case, the charging voltage is sometimes larger than +20 KV in the polyamide resin sheet (10) and larger than −2 KV in the ceramic layer (9). This phenomenon is similarly observed where the sheet is an EVOH resin sheet. Accordingly, the surface portion exposed by peeling of the quenched sheet is negatively (−) charged and negative (−) charges are applied to the surface of the molten resin sheet (10) extruded from the die (1), by the electrode (3), and thus an unsatisfactory pinning occurs due to a repulsion among the negative (−) charges. Furthermore, the negative (−) charges on the surface of the molten resin sheet (10) are summed with the negative (−) charges on the exposed surface of the quenching roller (2), and the voltage between the electrode and the metal substrate of the quenching roller (2) is elevated and sparking often occurs. This repulsion and generation of sparks can be avoided by positively (+) charging the surface of the molten resin sheet (10). In this case, however, it is difficult to generate a uniform corona discharge over the entire width of the electrode (3), but a streamer corona is generated locally and an abnormally large electric current flows locally, resulting in an unsatisfactory pinning.

Therefore, according to the process of Japanese Unexamined Patent Publication No. 61-95925 shown in FIG. 8, the sheet-forming operation can be carried out conveniently only under limited conditions such that charging on peeling does not occur, or even if separation charging on peeling occurs, the charges on the surface of the roller are very small.

Figure 9:
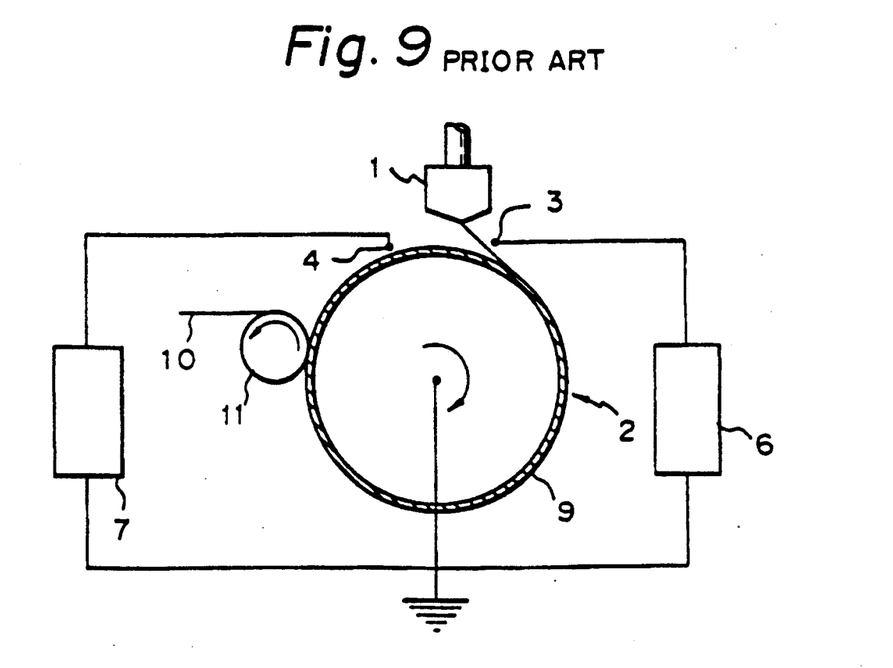

As a means for overcoming this disadvantage, there is known a process shown in FIG. 9 (prior art) in which static charges having a reverse polarity to that of the charges on the surface of the molten resin sheet and applied to the exposed surface portion of the quenching roller (2) (see Japanese Examined Patent Publication No. 48-29311). According to this process, however, with an increase of the sheet-forming speed, the extinction of electrostatic charges or charging with a reverse polarity on the surface of the quenching roller (2) becomes uneven and the pinning position of the molten sheet to the quenching roller (2) is slightly changed, the pinning line on the quenching roller is disturbed in several places, namely, the pinning line becomes non-straight, with the result that the thickness of the sheet (10) becomes uneven or several points of unsatisfactory pinning appear over the width direction of the quenching roller, and undesirable streaks extending in the conveying direction readily appear on the sheet due to a linear unsatisfactory pinning. This disadvantage will be overcome by increasing the voltage between the pinning electrode and the quenching roller to enhance the extinction of charges or charging with a reverse polarity. In this case, however, sparks are readily generated, and especially in the case of a ceramic insulation layer (9), holes are formed by these sparks and since a repair of holes is difficult, the insulation layer (9) must be frequently renewed, with the result that the sheet-preparing speed cannot be enhanced.

SUMMARY OF THE INVENTION

Under the above-mentioned background, the primary object of the present invention is to provide a process in which by using a quenching roller having an electrical insulating layer formed thereon, which is a rational means for preventing leakage of charges, a thermoplastic resin sheet having a smooth and excellent appearance is prepared at a high sheet-producing speed.

In accordance with the present invention, there is provided a process for the preparation of thermoplastic resin sheets, which comprises extruding a molten thermoplastic resin in the form of a sheet from a molding die; applying electrostatic charges to the extruded resin sheet from a first electrode, whereby the charged resin sheet is pinned to the surface of an electrical insulating layer of a quenching roller to quench the resin sheet, said quenching roller comprising an electrically earthed substrate and the electrical insulating layer formed on the surface of the substrate; peeling the quenched sheet from the surface of the quenching roller; and applying electrostatic charges of reverse polarity to that of the electrostatic charges from the first electrode to the exposed surface portion of the quenching roller from a second electrode, wherein the second electrode comprises a plurality of electrodes arranged at intervals along the rotating direction of the quenching roller between the sheet-peeling position where the quenched sheet is separated from the quenching roller and the sheet pinning-initiating position where the sheet to be quenched is pinned to the quenching roller, and the electrically insulating layer has a volume resistance and surface resistance of at least $10^7 \Omega$ and a surface roughness not larger than 0.3 $\mu$m expressed as the center line average roughness (Ra).

DESCRIPTION OF THE PREFERRED EMBODIMENTS

According to one preferred embodiment, an application of electrostatic charges by the electrode located nearest to the sheet pinning-initiating position among a plurality of the second electrodes is effected at least 0.3 second before the arrival at the sheet pinning-initiating position, and in every two adjacent second electrodes, application of electrostatic charges by the an electrode located nearer to the sheet-peeling position is effected at least 0.2 second before application of electrostatic charges by the other electrode.

According to another preferred embodiment, the charging by the second electrode is conducted in a manner such that the peeling charges on the exposed surface portion of the quenching roller are extinguished by the electrodes located upstream side and the exposed surface portion of the quenching roller is charged with a reverse polarity to that of the resin sheet to be quenched by the electrodes located downstream side.

According to still another preferred embodiment of the present invention, the quantity of electrostatic charges applied to the surface of the resin sheet from the first electrode is 1 to 5 mA as the electric current per m of the width of the sheet and the quantity of electrostatic charges applied to the exposed surface portion of the quenching roller from all of the second electrode is 0.6 to 4 mA as the electric current per m of the width of the resin sheet.

The present invention will now be described in detail.

The process for the preparation of thermoplastic resin sheets according to the present invention comprises the following steps:

(a) the step of extruding a molten thermoplastic resin into a sheet;
(b) the step of applying electrostatic charges to the surface of the thermoplastic resin sheet from a first electrode whereby the charged resin sheet is pinned to the surface of a quenching roller having an electrical insulating layer to quench the resin sheet;
(c) the step of peeling the cooled resin sheet from the surface of the quenching roller; and
(d) the step of applying electrostatic charges having a reverse polarity to that of the electrostatic charges applied from the first electrode to the sheet-peeled exposed surface portion of the quenching roller from second electrodes.

At step (a) of the present invention, parameters for extruding a molten thermoplastic resin in the form of a sheet can be appropriately selected according to the kind of the thermoplastic resin used and the intended use of the sheet.

The kind of the thermoplastic resin used in the present invention is not particularly critical, and materials customarily used for sheet-forming can be used. Nevertheless, the process for the preparation of sheets according to the present invention is most effectively applied to the production of resin sheets made from resins having a low electric resistance in the molten state, such as polyamide resin sheets and EVOH resin sheets.

As the polyamide resin sheet, there can be mentioned sheets of polyamide resins such as aliphatic polyamides such as nylon 6, nylon 6, 6 and nylon 4, 6, alicyclic polyamides having a cyclohexane ring or the like, a polyamide obtained by polymerizing a nylon salt composed of an aliphatic diamine and terephthalic acid and/or isophthalic acid, polyamides obtained by poly-condensing a nylon salt composed of xylylene diamine and an aliphatic dicarboxylic acid, copolyamides obtained by polymerizing a monomer for a homopolyamide and a nylon salt, blends of two or more of the foregoing polyamides, and blends of the foregoing polyamides with other thermoplastic resins blendable with the polyamides. As the thermoplastic resins blendable with the polyamides, there can be mentioned saponified or unsaponified ethylene/vinyl acetate copolymers; ionomer resins; copolymers of ethylene with acrylic acid, methacrylic acid, methylmethacrylic acid or ethylacrylic acid; modified polyolefins obtained by grafting an unsaturated carboxylic acid or a derivative thereof such as maleic anhydride or acrylic acid onto a polyolefin such as polyethylene, polypropylene or a ethylene/vinyl acetate copolymer.

As the EVOH resin sheet, there can be mentioned sheets of EVOH resins having an ethylene residue content of 20 to 50 mole % and a saponification degree of at least 95 mole %, blends of these EVOH resins with other blendable polymers, and saponified terpolymers of ethylene, vinyl acetate and a monomer copolymerizable therewith.

As the monomer copolymerizable therewith, there can be mentioned olefins such as propylene and isobutylene, unsaturated acids such as crotonic acid, acrylic acid, methacrylic acid and maleic acid, and esters thereof. As the polymer to be blended into EVOH, there can be mentioned saponification products of terpolymers and multi-component polymers of the ethylene/vinyl acetate system, ionomers, ethylene/vinyl acetate copolymers and polyamides represented by nylon 6.

In the present invention, the polyamide resin sheet or EVOH resin sheet includes not only a sheet composed solely of a polyamide or EVOH resin but also a co-extruded laminate having a layer of a polyamide or EVOH resin on the side to be pinned to the surface of the quenching roller.

Lubricants, inorganic fine particles, antistatic agents and pigments can be incorporated in the above-mentioned thermoplastic resin.

At step (b) of the present invention, electrostatic charges are applied to the surface of the unquenched thermoplastic resin sheet from a first electrode to which a voltage is applied.

Various electrodes such as a wire electrode, a needle electrode, a knife edge electrode, a sawtooth electrode and a tape electrode can be used as the first electrode in the present invention. But, since the electrode is readily contaminated with sublimates from the molten sheet, such as monomers and oligomers, a wire electrode or tape electrode that can be wound is preferably used. A wire electrode having a diameter of about 0.08 to 1.5 mm is preferable.

In the electrode used in the present invention, a portion other than the portion confronting the sheet can be masked with a spark-preventing Teflon tube.

The material of the electrode is not particularly critical. For example, there can be mentioned amorphous metals composed mainly of iron, nickel, cobalt or the like, and metals such as tungsten, stainless steel, iron, aluminum, nickel, copper and copper alloys.

Preferably the quantity of electrostatic charges applied to the surface of the molten thermoplastic resin sheet from the first electrode is 1 to 5 mA expressed as the electric current per m of the width of the sheet. If the quantity of the applied static charges is smaller than 1 mA per m of the width of the sheet, the pinning is unsatisfactory, and even if the sheet is pinned to the quenching roller, the pinning-initiating position on the quenching roller tends to shift and a thickness uneveness often occurs in the sheet. If the quantity of the applied charges exceeds 5 mA per m of the width of the sheet, sparking readily occurs and good results cannot be obtained. The value of the electric current is set within the range of 1 to 5 mA in view of the sheet-preparing speed and the thickness of the sheet, and in the case of the polyamide resin sheet or EVOH resin sheet, preferably as the sheet-preparing speed is increased or the thickness of the sheet is increased, the electric current is set at a large value within the above-mentioned range.

The first electrode is located at a position spaced slightly toward the die from the sheet pinning-initiating position where the sheet in the molten state is pinned to the quenching roller. Preferably the distance between the sheet and the first electrode is 5 to 25 mm. To control the electric current value within the above-mentioned range, preferably the electrode voltage is about 5 to 15 KV, although the preferred voltage differs to some extent according to the position of the electrode.

The charged resin sheet is pinned to the surface of the electrical insulating layer of the quenching roller having a substrate electrically earthed to quench the sheet.

An electrical insulating layer satisfying the following requirements is formed on the surface of the quenching roller.

Namely, the layer has a volume resistance and surface resistance of at least $10^7 \Omega$, and the surface roughness is not larger than 0.3 $\mu$m expressed as the center line average roughness (Ra).

The quenching roller having the electrical insulating layer on the surface is prepared by coating a ceramic material on the surface of a substrate roller of a metal, for example, by the gas type flame spraying method, the plasma flame spraying method or the explosion flame spraying method (see "Handbook of Flame Spraying" compiled by Japanese Association of Flame Spraying and published by New Technique Development Center in 1987).

Oxide ceramics such as $Al_2O_3$, $Cr_2O_3$ and $ZrO_2$ are preferably used as the ceramic material for the electrical insulating layer of the quenching roller, but any ceramic materials satisfying the above-mentioned requirements can be optionally used. Preferably, the thickness of the electrical insulating layer is as uniform as possible. If the thickness of the layer is not uniform, the electric resistance becomes uneven, and variations of the width and thickness of the sheet often occur at the electrostatic pinning step. Accordingly, the precision of dimensions such as circularity and cylindricity must be increased as much as possible, and at the grinding and polishing step after the flame spraying, the roller must be processed so that the precision of dimensions such as the circularity and cylindricity of the surface of the substrate roller is made in agreement with that of the core of the substrate roller.

The thickness of the insulating layer can be set according to the intended use in view of the electric resistance and heat conductivity of the ceramic material, and generally the thickness of the coating can be 50 to 250 $\mu$m. In the present invention, the thickness is not limited by these values.

An electrical insulating layer having a surface roughness smaller than 0.3 $\mu$m expressed as the center line average roughness (Ra) must be formed on the surface of the quenching roller used in the present invention.

If the surface roughness exceeds 0.3 $\mu$m, the appearance of the sheet is degraded because of the presence of an infinite number of fine circular bubbles and a smooth sheet having a good appearance and a high commercial value cannot be obtained. Accordingly, when the electrical insulating layer is formed, the starting materials in the form of a powder or a rod to be used for flame spraying and the flame spraying conditions must be carefully selected so that the center line average roughness (Ra) is not larger than 0.3 $\mu$m, and moreover, preferably the porosity of the flame-sprayed layer is as low as possible and attention is paid to the grinding and polishing conditions at the surface finishing of the roller.

In the instant specification and appended claims, the center line average roughness (Ra) is determined by placing a detecting portion of a contact feeler type surface roughness measuring device specified in JIS B-0651 (for example, Model SE-4AZ supplied by Kosaka Kenkyusho) on the upper portion of the quenching roller and moving the contact feeler in the axial direction of the roller under the conditions of a contact feeler top end radius of 5 $\mu$m, a feed speed of 0.1 mm/sec, and a cut-off value of 0.8 mm. Namely, the center line average roughness (Ra) indicates the surface roughness specified in JIS B-0651.

Each of the volume resistance and surface resistance of the surface of the electrical insulating layer formed on the quenching roller used in the present invention must be at least $10^7 \Omega$.

Since charges applied to the sheet leak out in the thickness direction of the electrical insulating layer and along the surface thereof, the volume resistance and surface resistance of the quenching roller must satisfy the above requirement. If the volume resistance and surface resistance are outside this range, the charges leak out and the pinning force is reduced, and therefore, it is impossible to manufacture sheets at a high speed.

The electric resistance of the electrical insulating layer is influenced by the kind and purity of the ceramic material to be flame-sprayed, the thickness of the layer, the porosity of the flame-sprayed film and the kind of the sealing material, and thus care should be taken when selecting the material to be flame-sprayed, the flame spraying conditions and the processing precision of the quenching roller are set so that the desired electric resistance can be obtained. In the case of flame spraying a ceramic material, even if the material to be flame-sprayed and the flame spraying conditions are the same, flame-sprayed films having the same composition cannot be always obtained, but in many cases, the composition differs slightly and therefore, strict control is required.

The volume resistance and surface resistance referred to in the instant specification and appended claims are values determined according to the measurement method disclosed on pages 326 through 328 of "Handbook of Electric Engineering" compiled by Japanese Association of Electricity and published on Apr. 10, 1978 by Japanese Association of Electricity.

The measurement method will now be described with reference to the accompanying drawings.

Figure 5:
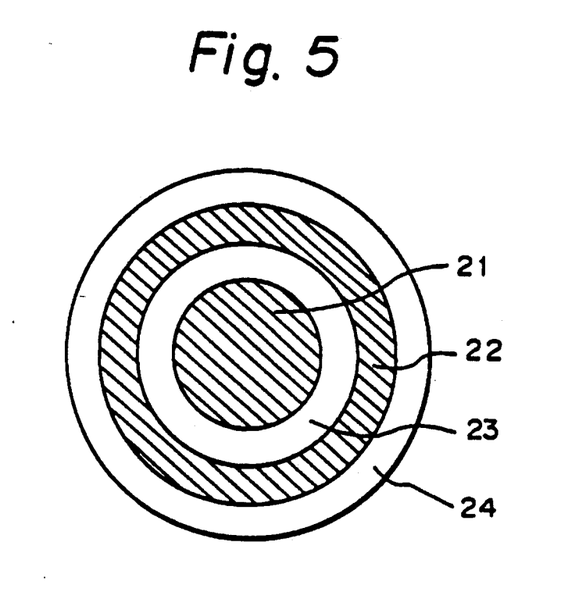
FIG. 5 is a plane view showing an electrode for measuring the electric resistance of the quenching roller.
Figure 6:
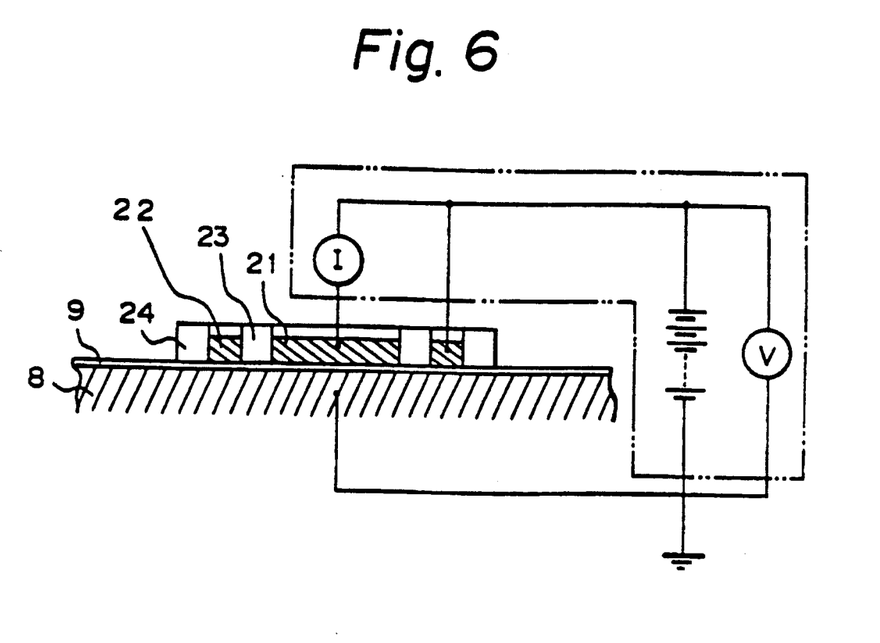
FIGS. 6 and 7 are diagrams illustrating an apparatus for measuring the electric resistance of the quenching roller.

FIG. 5 is a plane view illustrating an electrode used for measuring the resistance. The measurement electrode used in the present invention comprises a main electrode (21) having a diameter of 25 mm and a gaurd electrode (22) having an outer diameter of 65 mm and an inner diameter of 55 mm, an insulator (23) separating these electrodes, and an outer insulator (24). The electrodes are composed of mercury, and the insulators are circular frames composed of foamed polyethylene. This electrode is used in the bonded state and fixed to the surface of the quenching roller by a double-sided adhesive tape. FIG. 6 is a sectional view illustrating an electric circuit connected to the measurement electrode shown in FIG. 5, which is placed on the quenching roller for measuring the volume resistance, composed of the substrate roller 8 and the insulating layer 9.

Figure 7:
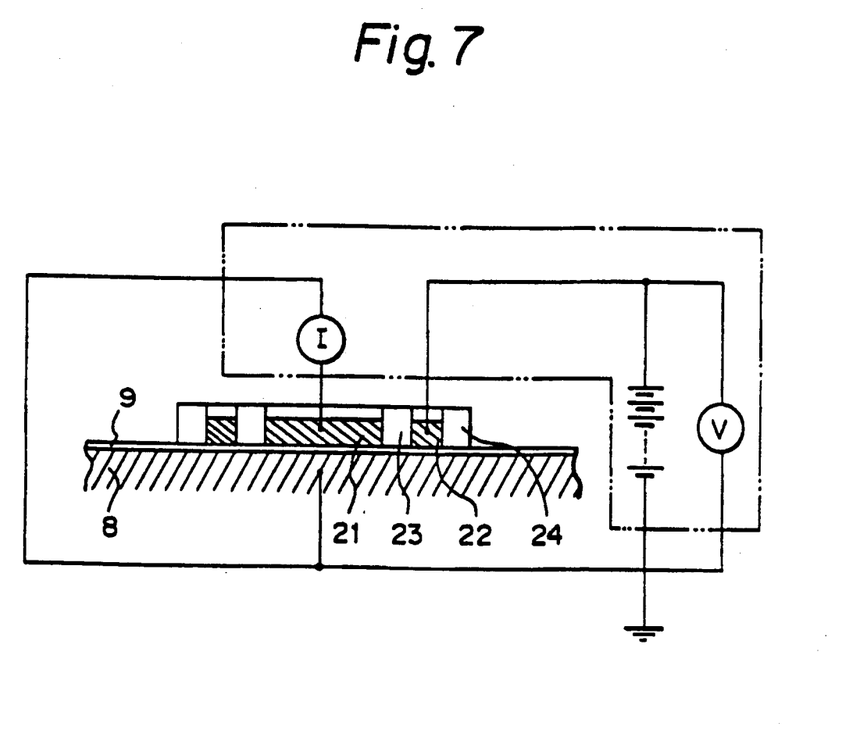

FIG. 7 is a sectional view illustrating an electric circuit connected to the measurement electrode, which is placed on the quenching roller for measuring the surface resistance.

The zone surrounded by a two-dot chain line in FIG. 6 and FIG. 7 indicates a super-insulation resistance tester. In the present invention, a super-insulation resistance tester supplied by Advan test (Model TR8601) is used.

The volume resistance of the electrical insulating layer of the quenching roller, referred to in the instant specification and appended claims, is a mean value of values obtained at four points in the circumferential direction of the quenching roller and three points in the axial direction; 12 points as a whole.

At step (d) of the preparation process of the present invention, the quenched sheet is peeled from the surface of the quenching roller. Note, the peeled sheet can be directly used as a product, but in many cases the sheet is subjected to the drawing treatment for a biaxially drawn film, the heat setting treatment and the like.

At step (e) of the preparation process of the present invention, electrostatic charges having a reverse polarity to that of the electrostatic charges applied by the first electrode at step (b) are applied by a second electrode.

The second electrode comprises a plurality of electrodes arranged at intervals along the flow of the rotating direction of the quenching roller between the sheet-peeling position where the quenched sheet is peeled from the quenching roller and the sheet pinning-initiating position where the sheet to be quenched is pinned to the quenching roller.

Application of electrostatic charges by the electrode located farthest downstream among a plurality of these second electrodes is preferably carried out at least 0.3 second before arrival at the sheet pinning-initiating position, and in every two adjacent second electrodes, an application of static charges by the electrode located upstream is preferably carried out at least 0.2 second before an application of static charges by the electrode located downstream.

If a single second electrode is used or the timing of the application of electrostatic charges from the second electrodes is different from the above-mentioned timing, the pinning line of the sheet to be quenched at the pinning-initiating position is disturbed, and a thickness unevenness in the flow direction of the sheet readily occurs, i.e., longitudinal streaks appear.

The positions for arrangement of the second electrodes should be determined while taking the above-mentioned timing of application of electrostatic charges into consideration, and furthermore, preferably the workability, the contamination of the electrodes and discharging to a molding die or peeling roller are taken into consideration, although this is not particularly critical.

Preferably, the quantity of charges applied to the exposed surface portion of the quenching roller by all of the second electrodes is 0.6 to 4 mA per m of the width of the sheet expressed as the electric current. If the quantity of charges is smaller than 0.6 mA, the pinning is unsatisfactory, and even if the sheet is pinned to the quenching roller, the pinning-initiating position on the quenching roller tends to shift and a thickness unevenness often occurs in the quenched sheet. If the quantity of electrostatic charges exceeds 4 mA, sparking readily occurs between the second electrodes and the quenching roller.

A method may be adopted in which, of a plurality of second electrodes, at least one electrode on the side of the quenched sheet-peeling position (on the upstream side) is used for extinguishing the peeling charges and at least one electrode on the side of the unquenched sheet-pinning position (on the downstream side) is used for applying electrostatic charges having a reverse polarity to the charges applied by the first electrode to the exposed surface of the quenching roller.

The gap between the charging point of the second electrodes and the surface of the quenching roller is preferably 5 to 25 mm, and the applied voltage is preferably about 5 to about 12 KV, although the preferred voltage differs to some extent according to the positions of the second electrodes.

The preparation process of the present invention will now be described with reference to the accompanying drawings.

One embodiment of the apparatus that can be used in the present invention will now be described with reference to a schematic side view of FIG. 1.

The apparatus according to this embodiment comprises a T die (1) for extruding a molten thermoplastic resin in the form of a sheet (10), a quenching roller 2 disposed below the T die (1), a first electrode (3) arranged between the T die (1) and the quenching roller (2), a peeling roller (11) which is arranged downstream of the quenching roller (2) and by which the thermoplastic resin sheet (10) is peeled from the quenching roller (2), a second electrode (4) for removing peeling charges, which is arranged above the surface of the quenching roller (2) on the side of the separating roller, another second electrode (5) for applying charges having a reverse polarity, which is arranged above the surface of the quenching roller (2) on the unquenched sheet-pinning side, a direc-current high-voltage power source (6) for the first electrode, a direct-current high-voltage power source (7) for the second electrodes, and lines for connecting these elements to one another. The quenching roller (2) comprises a substrate roller (8) and an electrical insulating layer (9) formed on the surface of the substrate roller (8).

In this apparatus, a thermoplastic resin sheet (10) is extruded from the T-die (1) and is negatively (−) charged by the first electrode (3) extending in the transverse direction of the sheet, and the sheet (10) is pinned to the quenching roller (2) and quenched. Then, the sheet (10) is peeled from the surface of the quenching roller (2) by the peeling roller (11).

The electrode (4) for extinguishing the peeling charges, which is arranged above the surface of the quenching roller (2) on the side of the peeling roller (11), applies charges having a reverse polarity to that of the peeling charges of the quenching roller to the surface of the quenching roller (2) on which the separation charges have been generated, and the second electrode (5) for the reverse polarity charging, which is arranged above the surface of the quenching roller (2) on the molten sheet-adhering side, applies charges having a reverse polarity to that of the charges from the first electrode to the surface of the quenching roller (2).

Figure 1:
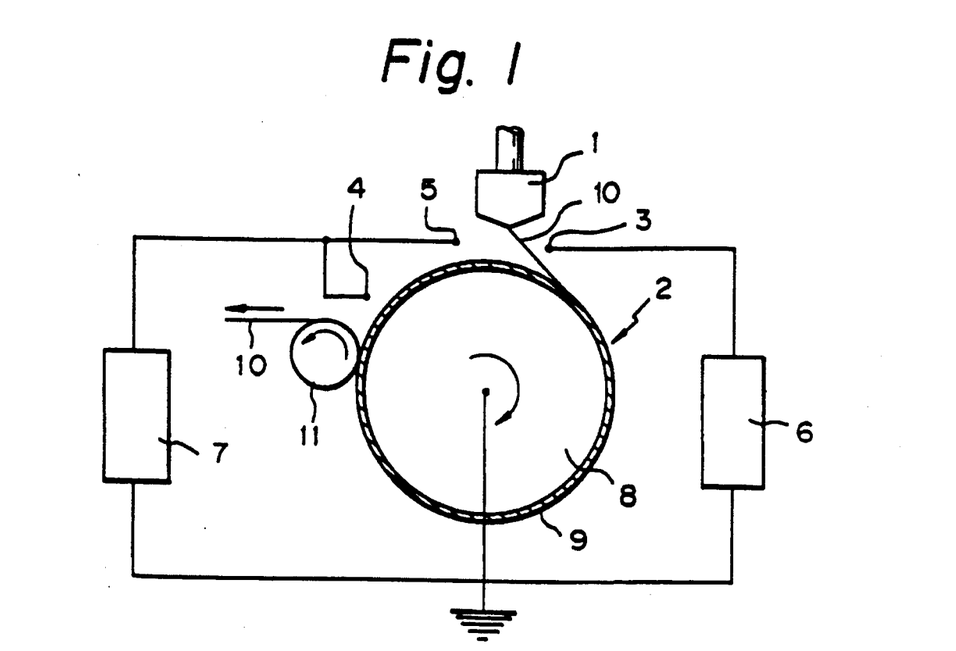
FIG. 1 is a schematic side view illustrating an electrostatic pinning apparatus that can be used in the preparation process of the present invention.
Figure 2:
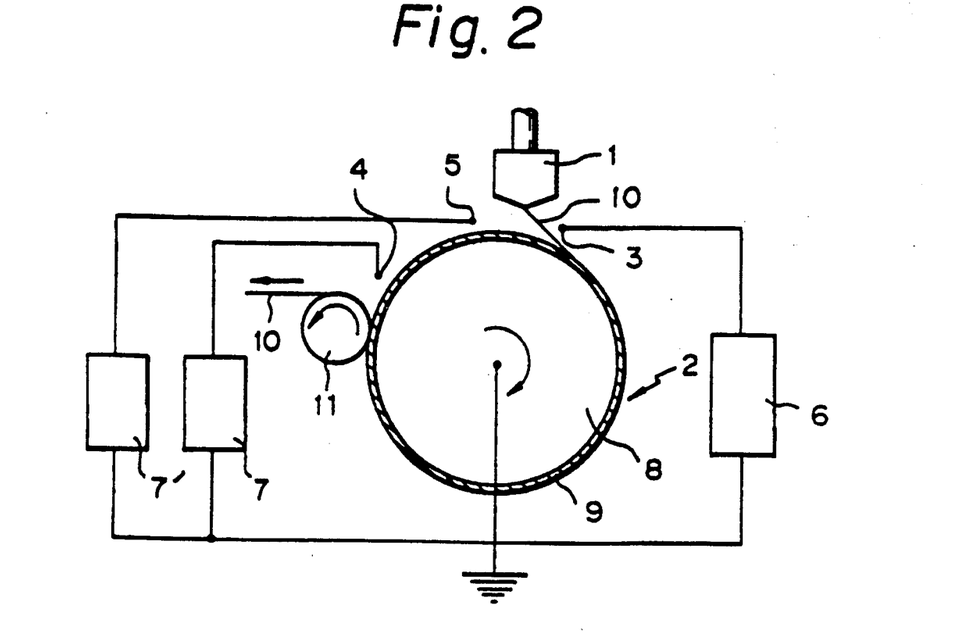
FIGS. 2 through 4 are schematic side views illustrating modifications of the electrostatic pinning apparatus that can be used in the present invention.
Figure 3:
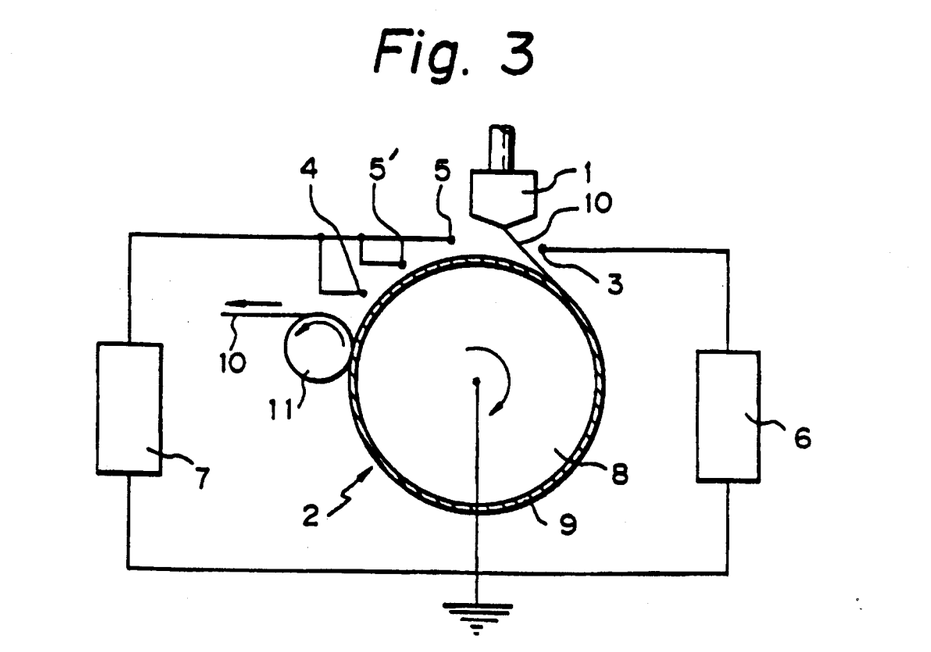
Figure 4:
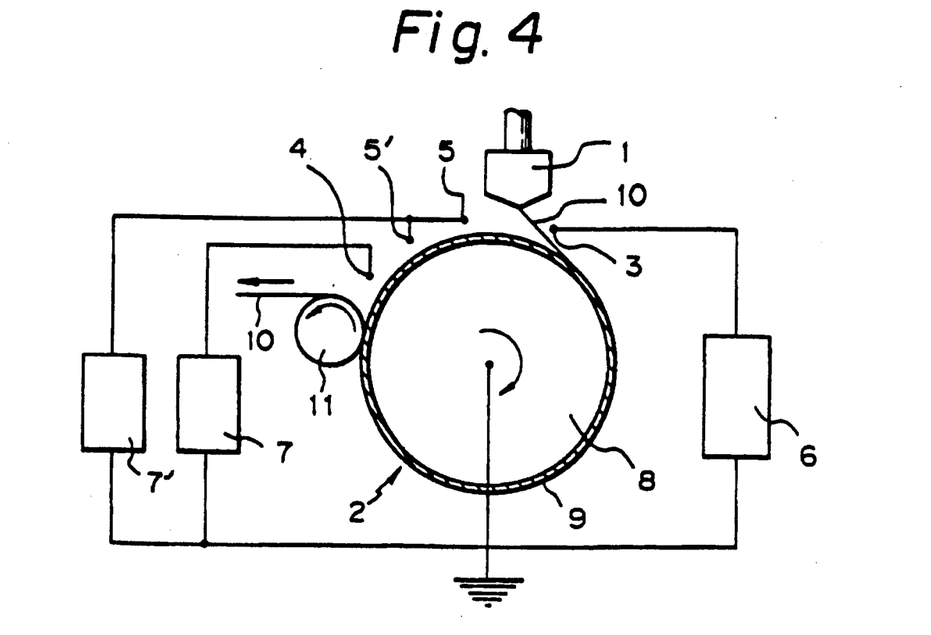

The present invention is not limited to the embodiment shown in FIG. 1, and various modifications can be made thereto. For example, as shown in FIGS. 2, 3 and 4, the second electrode comprising three electrodes (4), (5) and (5') are used, direct-current high-voltage power sources (7) and (7') for the second electrodes are connected in parallel to the charge-extinguishing second electrode (4) and the reverse polarity charging electrodes (5) and (5'), respectively, and voltages are applied to the respective second electrodes to supply electric currents.

In the preparation process of the present invention, since the electrical insulating layer formed on the surface of the quenching roller has a high electric resistance, even in a thermoplastic resin having a low volume resistivity in the molten state, the leakage of electrostatic charges applied to the sheet toward the quenching roller can be controlled. Since the surface roughness of the electrical insulating layer is very small and in the specific range, degradation of the appearance because of the presence of fine circular bubbles does not occur in the obtained resin sheet, and a resin sheet having a good drawability can be obtained.

Since the peeling charges are extinguished by the second electrode and electrostatic charges having a reverse polarity to that of the electrostatic charges applied by the first electrode are applied to the surface of the quenching roller, the pinning force obtained by the electrostatic attraction between the quenching roller and the thermoplastic sheet is increased. Furthermore, if the timing of application of charges by a plurality of second electrodes is controlled within the specific range, distribution of charges is entirely uniformalized on the surface of the quenching roller, and a good straightness is maintained in the pinning line at the sheet pinning-initiating position.

The present invention will now be described in detail with reference to the following examples and comparative examples. However, the present invention is not limited by these examples.

EXAMPLES 1-1 THROUGH 1-3 AND COMPARATIVE EXAMPLES 1-1 AND 1-2

A nylon 6 pellet (Novamid 1020CA supplied by Mitsubishi Kasei Corp.) was melted and kneaded at a cylinder temperature of 260° C. by an extruder having a diameter of 90 mm and extruded in the form of a sheet from a T die. The extruded sheet was quenched by a quenching roller having an outer diameter of 800 mm, which was rotated at a peripheral speed of 40 m/min and maintained at 30° C., using an electrostatic pinning apparatus as shown in FIG. 1, whereby a sheet having a width of about 400 mm and a thickness of about 140 $\mu$m was prepared.

An electrical insulating layer composed of a material shown in Table 1 and having the properties shown in Table 1 was formed on the surface of the quenching roller used.

The first electrode used was a tungsten wire having a diameter of 0.08 mm, and the gap between the sheet and the first electrode was about 15 mm. Each of two second electrodes was a tungsten wire having a diameter of 0.1 mm, and the distance between the second electrodes was about 250 mm. The gap between the surface of the quenching roller and each second electrode was about 10 mm. The applied voltage and current were as shown in Table 1.

The surface condition and pinned state in each run of the obtained sheets prepared under the above conditions are shown in Table 1.

EXAMPLES 1-4 THROUGH 1-6 AND COMPARATIVE EXAMPLES 1-3 THROUGH 1-5

Sheets were prepared under conditions shown in Table 1 in the same manner as described in Example 1-1.
The results are shown in Table 1.

EXAMPLE 1-7

A sheet was prepared in the same manner as described in Example 1-1 except that the same nylon 6 pellet as described above and an EVOH (Soanol ET supplied by Nippon Synthetic Chem. Ind.) were melted and kneaded by three extruders having a diameter of 65 mm (among which two extruders were used for nylon 6 and the other was used for EVOH, respectively), and were coextruded in the form of a laminated sheet consisting of three layers, i.e., a nylon 6 layer, an EVOH layer, and a nylon 6 layer, each layer having a thickness of 50 $\mu$m, by using a multi-manifold type T die.

The results are shown in Table 1.

EXAMPLES 1-8 and 1-9

A sheet was prepared in the same manner as described in Example 1-1 except that an electrostatic pinning apparatus as shown in FIG. 2 was used instead of the electrostatic pinning apparatus shown in FIG. 1, which was used in Example 1-1, and the conditions shown in Table 1 were adopted.

The results are shown in Table 1.

EXAMPLES 1-10 and 1-11

A sheet was prepared in the same manner as described in Example 1-1 except that the conditions were changed as shown in Table 1.

The results are shown in Table 1.

TABLE 1

| | Electrical insulating layer | | | | | | |
|---|---|---|---|---|---|---|---|
| | Material | Flame spraying | Thickness ($\mu$m) | Surface roughness Ra ($\mu$m) | Volume resistance ($\Omega$) | Surface resistance ($\Omega$) | Sheet-forming speed (m/min) |
| Example | | | | | | | |
| 1-1 | 99% $Al_2O_3$ | Explosion | 82 | 0.15 | $5 \times 10^{11}$ | $2 \times 10^{12}$ | 40 |
| 1-2 | 99% $Al_2O_3$ | Plasma | 75 | 0.3 | $3 \times 10^{7}$ | $4 \times 10^{7}$ | 40 |
| 1-3 | 99% $Al_2O_3$ | Plasma | 197 | 0.16 | $6 \times 10^{8}$ | $1 \times 10^{9}$ | 40 |
| 1-4 | 99% $Al_2O_3$ | Explosion | 82 | 0.15 | $5 \times 10^{11}$ | $2 \times 10^{12}$ | 30 |
| 1-5 | 99% $Al_2O_3$ | Explosion | 82 | 0.15 | $5 \times 10^{11}$ | $2 \times 10^{12}$ | 50 |
| 1-6 | 99% $Al_2O_3$ | Explosion | 82 | 0.15 | $5 \times 10^{11}$ | $2 \times 10^{12}$ | 60 |

TABLE 1-continued

| | | | | | | | |
|---|---|---|---|---|---|---|---|
| 1-7 | 99% $Al_2O_3$ | Explosion | 82 | 0.15 | $5 \times 10^{11}$ | $2 \times 10^{12}$ | 40 |
| 1-8 | 99% $Al_2O_3$ | Explosion | 82 | 0.15 | $5 \times 10^{11}$ | $2 \times 10^{12}$ | 40 |
| 1-9 | 99% $Al_2O_3$ | Explosion | 82 | 0.15 | $5 \times 10^{11}$ | $2 \times 10^{12}$ | 40 |
| Comparative Example | | | | | | | |
| 1-1 | $Cr_2O_3$ | Plasma | 54 | 0.12 | $3 \times 10^5$ | $4 \times 10^5$ | 30 |
| 1-2 | 99% $Al_2O_3$ | Plasma | 216 | 0.40 | $4 \times 10^5$ | $6 \times 10^8$ | 40 |
| 1-3 | 99% $Al_2O_3$ | Explosion | 82 | 0.15 | $5 \times 10^{11}$ | $2 \times 10^{12}$ | 40 |
| 1-4 | 99% $Al_2O_3$ | Explosion | 82 | 0.15 | $5 \times 10^{11}$ | $2 \times 10^{12}$ | 40 |
| 1-5 | 99% $Al_2O_3$ | Explosion | 82 | 0.15 | $5 \times 10^{11}$ | $2 \times 10^{12}$ | 40 |
| Example | | | | | | | |
| 1-10 | 99% $Al_2O_3$ | Explosion | 82 | 0.15 | $5 \times 10^{11}$ | $2 \times 10^{12}$ | 40 |
| 1-11 | 99% $Al_2O_3$ | Explosion | 82 | 0.15 | $5 \times 10^{11}$ | $2 \times 10^{12}$ | 40 |

| | First electrode | | Second electrodes | | | | | | | Sheet forming state and results | | |
| | | | Upstream side | | | Downstream side | | | Total | | Thickness | Surface roughness | |
| | Voltage (kV) | Current (mA) | Voltage (kV) | Current (mA) | Timing *1 (sec) | Voltage (kV) | Current (mA) | Timing *2 (sec) | current (mA) | Pinning state | variation (μm) | Ra (μm) | Sheet appearance |
|---|---|---|---|---|---|---|---|---|---|---|---|---|---|
| Example | | | | | | | | | | | | | |
| 1-1 | −12.0 | 0.8 | +6.6 | 0.25 | 0.38 | +6.6 | 0.25 | 0.3 | 0.5 | Good | 3.0 | 0.05 | Smooth and good |
| 1-2 | −12.5 | 0.9 | +7.0 | 0.4 | 0.38 | +7.0 | 0.4 | 0.35 | 0.8 | Good | 3.2 | 0.10 | Smooth and good |
| 1-3 | −12.1 | 0.8 | +6.8 | 0.25 | 0.38 | +6.8 | 0.25 | 0.3 | 0.5 | Good | 3.2 | 0.05 | Smooth and good |
| 1-4 | −10.2 | 0.7 | +6.6 | 0.25 | 0.3 | +6.6 | 0.25 | 0.4 | 0.5 | Good | 3.2 | 0.08 | Smooth and good |
| 1-5 | −13.2 | 1.0 | +7.0 | 0.3 | 0.3 | −7.0 | 0.3 | 0.3 | 0.6 | Good | 3.6 | 0.06 | Smooth and good |
| 1-6 | −14.3 | 1.2 | +8.0 | 0.5 | 0.2 | +8.0 | 0.5 | 0.3 | 1.0 | Good | 3.0 | 0.06 | Smooth and good |
| 1-7 | −12.0 | 0.8 | +6.6 | 0.25 | 0.38 | +6.6 | 0.25 | 0.35 | 0.5 | Good | 3.0 | 0.09 | Smooth and good |
| 1-8 | −12.0 | 0.8 | +7.0 | 0.4 | 0.25 | +6.2 | 0.2 | 0.3 | 0.6 | Good | 3.1 | 0.10 | Smooth and good |
| 1-9 | −12.0 | 0.8 | +6.2 | 0.2 | 0.25 | +7.1 | 0.4 | 0.3 | 0.6 | Good | 3.0 | 0.07 | Smooth and good |
| Comparative Example | | | | | | | | | | | | | |
| 1-1 | −15.0 | 2.8 | +10.0 | 0.5 | 0.5 | +10.0 | 0.5 | 0.35 | 1.0 | Not pinned | — | 0.21 | Large thickness unevenness |
| 1-2 | −12.0 | 0.8 | +7.0 | 0.25 | 0.38 | +7.0 | 0.25 | 0.3 | 0.5 | Good | — | 0.33 | Fine circular bubbles |
| 1-3 | −12.0 | 0.8 | *3 | *3 | *3 | *3 | *3 | *3 | *3 | Pinned very weakly | — | 0.25 | Large thickness unevenness |
| 1-4 | *3 | *3 | +7.0 | 0.3 | 0.25 | +7.0 | 0.3 | 0.35 | 0.6 | Not Pinned | — | 0.25 | Large thickness unevenness |
| 1-5 | −12.0 | 0.8 | *3 | *3 | *3 | +8.0 | 0.5 | 0.3 | 0.5 | Pinning position disturbed | 6.0 | 0.23 | Streaks |
| Example | | | | | | | | | | | | | |
| 1-10 | −12.0 | 0.8 | +6.6 | 0.25 | 0.15 | +6.6 | 0.25 | 0.3 | 0.5 | Pinning position disturbed | 4.3 | 0.09 | Streaks occasionally occurred |
| 1-11 | −12.0 | 0.8 | +6.6 | 0.25 | 0.2 | +6.6 | 0.25 | 0.2 | 0.5 | Pinning position disturbed | 4.3 | 0.10 | Streaks occasionally occurred |

*1 Time elapsing from application of charges by the second electrode on upstream side to application of charges by the second electrode on downstream side.
*2 Time elapsing from application of charges by the second electrode on downstream side to arrival of the molten resin sheet at the pinning-initiating point.
*3 Not used.

EXAMPLES 2-1 THROUGH 2-3 AND COMPARATIVE EXAMPLES 2-1 AND 2-2

An EVOH 6 pellet (Soanol ET supplied by Nippon Synthetic) was melted and kneaded at a cylinder temperature of 230° C. by an extruder having a diameter of 90 mm and extruded in the form of a sheet from a T die. The extruded sheet was quenched by a quenching roller having an outer diameter of 800 mm, which was rotated at a peripheral speed of 40 m/min and maintained at 30° C., using an electrostatic pinning apparatus as shown in FIG. 1, whereby a sheet having a width of about 400 mm and a thickness of about 140 μm was prepared.

An electrical insulating layer composed of a material shown in Table 2 and having properties shown in Table 2 was formed on the surface of the quenching roller used.

The first electrode used was a tungsten wire having a diameter of 0.08 mm, and the gap between the sheet and the first electrode was about 15 mm. Each of two second electrodes was a tungsten wire having a diameter of 0.1 mm, and the distance between the second electrodes was about 250 mm. The gap between the surface of the quenching roller and each second electrode was about 10 mm. The applied voltage and current were as shown in Table 2.

The surface condition and pinning state of each run of the obtained sheets prepared under the above conditions are shown in Table 2.

EXAMPLES 2-4 THROUGH 2-6 AND COMPARATIVE EXAMPLES 2-3 THROUGH 2-5

Sheets were prepared under the conditions shown in Table 2 in the same manner as described in Example 2-1.
The results are shown in Table 2.

EXAMPLE 2-7

A sheet was prepared in the same manner as described in Example 2-1 except that a blend comprising 80% by weight of the same EVOH pellet as described above and 20% by weight of a nylon 6 pellet (Novamid EN120 supplied by Mitsubishi Kasei Corp.) was melted and kneaded at 240° C.
The results are shown in Table 2.

EXAMPLE 2-8

A sheet was prepared in the same manner as described in Example 2-1 except that the same nylon 6 6 pellet as described above and EVOH (Soanol ET supplied by Nippon Synthetic Chem. Ind.) were melted and kneaded by two extruders having a diameter of 65 mm, respectively, and were coextruded in the form of a laminated sheet consisting of an EVOH layer having a thickness of 50 $\mu$m, and a nylon 6 layer having a thickness of 100 $\mu$m by using a multi-manifold type T die, and the EVOH layer was pinned on the surface of the quenching roller.

The results are shown in Table 2.

EXAMPLES 2-9 AND 2-10

A sheet was prepared in the same manner as described in Example 2-1 except that an electrostatic pinning apparatus as shown in FIG. 2 was used instead of the electrostatic pinning apparatus shown in FIG. 1, which was used in Example 2-1, and the conditions shown in Table 2 were adopted.
The results are shown in Table 2

EXAMPLES 2-11 AND 2-12

A sheet was prepared in the same manner as described in Example 2-1 except that the conditions were changed as shown in Table 2
The results are shown in Table 2.

TABLE 2

| | Electrical insulating layer | | | | | | Sheet-forming speed (m/min) |
|---|---|---|---|---|---|---|---|
| | Material | Flame spraying | Thickness ($\mu$m) | Surface roughness Ra ($\mu$m) | Volume resistance ($\Omega$) | Surface resistance ($\Omega$) | |
| Example | | | | | | | |
| 2-1 | 99% Al$_2$O$_3$ | Explosion | 82 | 0.15 | $5 \times 10^{11}$ | $2 \times 10^{11}$ | 40 |
| 2-2 | 99% Al$_2$O$_3$ | Plasma | 75 | 0.3 | $3 \times 10^{7}$ | $4 \times 10^{7}$ | 40 |
| 2-3 | 96% Al$_2$O$_3$ | Plasma | 197 | 0.16 | $6 \times 10^{8}$ | $1 \times 10^{9}$ | 40 |
| 2-4 | 99% Al$_2$O$_3$ | Explosion | 82 | 0.15 | $5 \times 10^{11}$ | $2 \times 10^{12}$ | 30 |
| 2-5 | 99% Al$_2$O$_3$ | Explosion | 82 | 0.15 | $5 \times 10^{11}$ | $2 \times 10^{12}$ | 50 |
| 2-6 | 99% Al$_2$O$_3$ | Explosion | 82 | 0.15 | $5 \times 10^{11}$ | $2 \times 10^{12}$ | 60 |
| 2-7 | 99% Al$_2$O$_3$ | Explosion | 82 | 0.15 | $5 \times 10^{11}$ | $2 \times 10^{12}$ | 40 |
| 2-8 | 99% Al$_2$O$_3$ | Explosion | 82 | 0.15 | $5 \times 10^{11}$ | $2 \times 10^{12}$ | 40 |
| 2-9 | 99% Al$_2$O$_3$ | Explosion | 82 | 0.15 | $5 \times 10^{11}$ | $2 \times 10^{12}$ | 40 |
| 2-10 | 99% Al$_2$O$_3$ | Plasma | 82 | 0.15 | $5 \times 10^{11}$ | $2 \times 10^{12}$ | 40 |
| Comparative Example | | | | | | | |
| 2-1 | Cr$_2$O$_3$ | Plasma | 54 | 0.12 | $3 \times 10^{5}$ | $4 \times 10^{5}$ | 30 |
| 2-2 | 94% Al$_2$O$_3$ | Plasma | 216 | 0.40 | $4 \times 10^{8}$ | $6 \times 10^{8}$ | 40 |
| 2-3 | 99% Al$_2$O$_3$ | Explosion | 82 | 0.15 | $5 \times 10^{11}$ | $2 \times 10^{12}$ | 40 |
| 2-4 | 99% Al$_2$O$_3$ | Explosion | 82 | 0.15 | $5 \times 10^{11}$ | $2 \times 10^{12}$ | 40 |
| 2-5 | 99% Al$_2$O$_3$ | Explosion | 82 | 0.15 | $5 \times 10^{11}$ | $2 \times 10^{12}$ | 40 |
| Example | | | | | | | |
| 2-11 | 99% Al$_2$O$_3$ | Explosion | 82 | 0.15 | $5 \times 10^{11}$ | $2 \times 10^{12}$ | 40 |
| 2-12 | 99% Al$_2$O$_3$ | Explosion | 82 | 0.15 | $5 \times 10^{11}$ | $2 \times 10^{12}$ | 40 |

| | First electrode | | Second electrodes | | | | | | Sheet forming state and results | | | |
|---|---|---|---|---|---|---|---|---|---|---|---|---|
| | | | Upstream side | | | Downstream side | | | Total | | | |
| | Voltage (kV) | Current (mA) | Voltage (kV) | Current (mA) | Timing *1 (sec) | Voltage (kV) | Current (mA) | Timing *2 (sec) | current (mA) | Pinning state | Thickness variation ($\mu$m) | Surface roughness Ra ($\mu$m) | Sheet appearance |
| Example | | | | | | | | | | | | | |
| 2-1 | −12.0 | 0.8 | +6.6 | 0.25 | 0.38 | +6.6 | 0.25 | 0.3 | 0.5 | Good | 3.0 | 0.06 | Smooth and good |
| 2-2 | −12.5 | 0.9 | +7.0 | 0.4 | 0.38 | +7.0 | 0.4 | 0.35 | 0.8 | Good | 3.2 | 0.09 | Smooth and good |
| 2-3 | −12.1 | 0.8 | +6.8 | 0.25 | 0.38 | +6.8 | 0.25 | 0.3 | 0.5 | Good | 3.2 | 0.05 | Smooth and good |
| 2-4 | −10.2 | 0.7 | +6.6 | 0.25 | 0.3 | +6.6 | 0.25 | 0.4 | 0.5 | Good | 3.2 | 0.08 | Smooth and good |
| 2-5 | −13.2 | 1.0 | +7.0 | 0.3 | 0.3 | +7.0 | 0.3 | 0.3 | 0.6 | Good | 3.6 | 0.05 | Smooth and good |
| 2-6 | −14.3 | 1.2 | +8.0 | 0.5 | 0.2 | +8.0 | 0.5 | 0.3 | 1.0 | Good | 3.0 | 0.05 | Smooth and |

TABLE 2-continued

| | First electrode | | Second electrodes | | | | | | Total | Sheet forming state and results | | | |
| | | | Upstream side | | | Downstream side | | | | | Thickness | Surface roughness | |
| | Voltage (kV) | Current (mA) | Voltage (kV) | Current (mA) | Timing *1 (sec) | Voltage (kV) | Current (mA) | Timing *2 (sec) | current (mA) | Adhesion state | variation (μm) | Ra (μm) | Sheet appearance |
|---|---|---|---|---|---|---|---|---|---|---|---|---|---|
| 2-7 | −12.0 | 0.8 | +6.6 | 0.25 | 0.25 | +6.6 | 0.25 | 0.35 | 0.5 | Good | 3.2 | 0.06 | good Smooth and good |
| 2-8 | −12.0 | 0.8 | +6.6 | 0.25 | 0.25 | +6.6 | 0.25 | 0.35 | 0.5 | Good | 3.8 | 0.10 | Smooth and good |
| 2-9 | −12.0 | 0.8 | +7.0 | 0.4 | 0.25 | +6.2 | 0.2 | 0.3 | 0.6 | Good | 3.3 | 0.09 | Smooth and good |
| 2-10 | −12.0 | 0.8 | +6.2 | 0.2 | 0.25 | +7.1 | 0.4 | 0.3 | 0.6 | Good | 3.1 | 0.08 | Smooth and good |

| | First electrode | | Second electrodes | | | | | | Total | Sheet forming state and results | | | |
| | | | Upstream side | | | Downstream side | | | | | Thickness | Surface roughness | |
| | Voltage (kV) | Current (mA) | Voltage (kV) | Current (mA) | Timing *1 (sec) | Voltage (kV) | Current (mA) | Timing *2 (sec) | current (mA) | Adhesion state | variation (μm) | Ra (μm) | Sheet appearance |
|---|---|---|---|---|---|---|---|---|---|---|---|---|---|
| Comparative Example | | | | | | | | | | | | | |
| 2-1 | −15.0 | 2.8 | +10.0 | 0.5 | 0.38 | +10.0 | 0.5 | 0.35 | 1.0 | Not pinned | — | — | — |
| 2-2 | −12.0 | 0.8 | +7.0 | 0.25 | 0.38 | +7.0 | 0.25 | 0.3 | 0.5 | Good | — | 0.35 | Fine circular bubbles |
| 2-3 | −12.0 | 0.8 | *3 | *3 | *3 | *3 | *3 | *3 | *3 | Pinned very weakly | — | — | Very poor |
| 2-4 | *3 | *3 | +7.0 | 0.3 | 0.25 | +7.0 | 0.3 | 0.35 | 0.6 | Not pinned | — | — | — |
| 2-5 | −12.0 | 0.8 | *3 | *3 | *3 | +8.0 | 0.5 | 0.3 | 0.5 | Pinning position disturbed | 6.0 | 0.09 | Thickness uneven, streaks |

| | First electrode | | Second electrodes | | | | | | Total | Sheet forming state and results | | | |
| | | | Upstream side | | | Downstream side | | | | | Thickness | Surface roughness | |
| | Voltage (kV) | Current (mA) | Voltage (kV) | Current (mA) | Timing *1 (sec) | Voltage (kV) | Current (mA) | Timing *2 (sec) | current (mA) | Pinning state | variation (μm) | Ra (μm) | Sheet appearance |
|---|---|---|---|---|---|---|---|---|---|---|---|---|---|
| Example | | | | | | | | | | | | | |
| 2-11 | −12.0 | 0.8 | +6.6 | 0.25 | 0.15 | +6.6 | 0.25 | 0.3 | 0.5 | Pinning position disturbed | 4.5 | 0.10 | Streaks occasionally occurred |
| 2-12 | −12.0 | 0.8 | +6.6 | 0.25 | 0.2 | +6.6 | 0.25 | 0.2 | 0.5 | Pinning position disturbed | 4.5 | 0.09 | Streaks occasionally occurred |

*1 Time elapsing from application of charges by the second electrode on upstream side to application of charges by the second electrode on downstream side.
*2 Time elapsing from application of charges by the second electrode on downstream side to arrival of the molten resin sheet at the pinning-initiating point.
*3 Not used.

Note, the "thickness variation" in Tables 1 and 2 was determined as follows.

With respect to the central part (350 mm) of the formed sheet having a width of 400 mm, sampling was effected 10 times at intervals of 30 minutes during the sheet-forming operation, and the thickness was measured at intervals of 30 mm in the width direction by a bench thickness gauge and the difference between the maximum thickness and minimum thickness among the obtained values was determined as the thickness variation.

In the case of an undrawn sheet to be used for producing the biaxially drawn film, if the thickness variation is within ±2%, preferably within ±1.5%, a product having a good thickness precision is obtained. Accordingly, in the case of a sheet having a thickness of 140 μm, the thickness variation should be smaller than 5.6 μm, preferably smaller than 4.2 μm.

In Tables 1 and 2, "surface roughness" of the sheet is a mean value of values of the center line average roughness (Ra) measured at 10 points according to JIS B-0651. From the practical viewpoint, this value should be smaller than 0.15 μm, preferably smaller than 0.1 μm.

The following remarkable effects can be obtained according to the present invention, and therefore, the present invention has a very high industrial utilization value.

(1) According to the preparation process of the present invention, by the action of the second electrode comprising a plurality of electrodes arranged between the sheet-peeling position, and the sheet pinning-initiating position, a uniform sheet having an excellent appearance can be stably prepared at a high speed.

(2) According to the preparation process of the present invention, the surface of the electrical insulating layer of the quenching roller used is smooth and the surface roughness is within the specific range, and therefore, fine circular bubbles causing a degradation of the appearance are not formed in the obtained sheet and a sheet having an excellent drawability can be obtained.

(3) According to a preferred embodiment of the preparation process of the present invention, by the second electrode comprising a plurality of electrodes, the peeling charges are extinguished and electrostatic charges having a reverse polarity to that of the electrostatic charges applied by the first electrode are applied to the surface of the quenching roller, and therefore, the pinning force obtained by the electrostatic attracting force between the quenching roller and the thermoplastic sheet is increased.

(4) According to a preferred embodiment of the preparation process of the present invention, since the timing of the application of the charges by a plurality of electrodes is adjusted within the specific range, the distribution of charges on the surface of the quenching roller can be entirely uniformalized, and a good straightness is maintained in the pinning line at the sheet pinning-initiating position and a sheet having a small thickness unevenness can be obtained.

(5) In the preparation process of the present invention, since the second electrode comprising a plurality of electrodes are used, the total applied charge quantity applied from these electrodes can be divided and the electric current applied per electrode can be reduced, and therefore, the risk of generation of sparks between these electrodes and the quenching roller can be drastically decreased and the contamination of the electrodes can be controlled, whereby the occurrence of an unsatisfactory pinning can be prevented.

We claim:

1. A process for the preparation of thermoplastic resin sheets, wherein said thermoplastic resin is selected from the group consisting of a polyamide resin and a saponified ethylene/vinyl acetate copolymer resin, said process comprising:

extruding molten thermoplastic resin the form of a sheet from a molding die;

applying electrostatic charges to the as-extruded resin sheet from a first electrode, whereby the charged resin sheet is pinned to the surface of an electrical insulating layer of a quenching roller to quench the resin sheet, said quenching roller comprising an electrically earthed substrate and the electrical insulating layer formed on the surface of the substrate, and said electrical insulating layer having a volume resistance and surface resistance of at least $10^7$ Ω and a surface roughness not larger than 0.3 μm expressed as the center line average roughness (Ra);

peeling the quenched sheet from the surface of the quenching roller; and applying static charges having a reverse polarity to that of the electrostatic charges from the quenching roller from the first electrode to the exposed surface portion of the quenching roller from a second electrode, wherein the second electrode comprises a plurality of electrodes arranged at intervals along the rotation direction of the quenching roller between the sheet-peeling position where the quenched sheet is peeled from the quenching roller and the sheet pinning-initiating position where the asextruded sheet to be quenched is pinned to the cooling roller, and the application of electrostatic charges by the electrode located nearest to the sheet pinning-initiating position among a plurality of the second electrodes is effected at least 0.3 second before the arrival at the sheet pinning-initiating position, and in every two adjacent second electrodes, application of static charges by an electrode located nearer to the sheet-peeling position is effected at least 0.2 second before application of electrostatic charges by the other electrode.

2. A process for the preparation of thermoplastic resin sheets according to claim 1, wherein the peeling electrostatic charges on the exposed surface of the quenching roller are extinguished by at least one second electrode located upstream and the exposed surface of the quenching roller is charged with a reverse polarity to that of the sheet to be quenched by at least one second electrode located downstream.

3. A process for the preparation of thermoplastic resin sheets according to claim 1, wherein the quantity of electrostatic charges applied to the surface of the resin sheet from the first electrode is 1 to 5 mA as the electric current per m of the width of the resin sheet and the quantity of electrostatic charges applied to the exposed surface portion of the quenching roller from all of the second electrodes is 0.6 to 4 mA as the electric current per m of the width of the resin sheet.

* * * * *